(12) United States Patent
Scott et al.

(10) Patent No.: US 7,855,714 B2
(45) Date of Patent: Dec. 21, 2010

(54) METHOD AND APPARATUS FOR CONTROLLING A DISPLAY IN AN ELECTRONIC DEVICE

(75) Inventors: Sherryl Lee Lorraine Scott, Toronto (CA); Julian Paas, Mississauga (CA); Joel Steele, Richmond Hill (CA); Patryk Adamczyk, Toronto (CA); David Noel Vanden Heuvel, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 651 days.

(21) Appl. No.: 11/469,611

(22) Filed: Sep. 1, 2006

(65) Prior Publication Data

US 2008/0057941 A1    Mar. 6, 2008

(51) Int. Cl.
*G09G 5/08* (2006.01)
(52) U.S. Cl. .................. 345/167; 345/156; 345/173; 455/556.1
(58) Field of Classification Search .......... 345/156–167
See application file for complete search history.

(56) References Cited

U.S. PATENT DOCUMENTS

| | | | |
|---|---|---|---|
| 5,121,152 A * | 6/1992 | Wagner | 396/121 |
| 5,615,384 A * | 3/1997 | Allard et al. | 715/800 |
| 6,384,861 B1 | 5/2002 | Lindsey | |
| 6,628,333 B1 | 9/2003 | Gowda et al. | |
| 6,774,890 B2 * | 8/2004 | Engholm | 345/173 |
| 7,043,284 B2 | 5/2006 | Tornaghi | |
| 7,443,404 B2 * | 10/2008 | Kawamoto et al. | 345/660 |
| 2003/0103156 A1 * | 6/2003 | Brake et al. | 348/333.01 |
| 2004/0051695 A1 * | 3/2004 | Yamamoto et al. | 345/156 |
| 2004/0207722 A1 | 10/2004 | Koyama et al. | |
| 2005/0024341 A1 * | 2/2005 | Gillespie et al. | 345/173 |
| 2006/0246874 A1 * | 11/2006 | Sullivan | 455/412.1 |
| 2006/0258396 A1 * | 11/2006 | Matsuoka | 455/556.1 |
| 2007/0035513 A1 * | 2/2007 | Sherrard et al. | 345/157 |
| 2007/0099655 A1 * | 5/2007 | Lomba et al. | 455/556.1 |

FOREIGN PATENT DOCUMENTS

| | | |
|---|---|---|
| CA | 2441301 | 10/2002 |
| CA | 2499095 | 9/2005 |
| EP | 1391806 A1 | 2/2004 |
| JP | 2002351598 A | 12/2002 |
| JP | 2005045650 A * | 2/2005 |
| KR | 20050037383 A | 4/2005 |

OTHER PUBLICATIONS

Chinese Patent Application No. 200680055704.2 Office Action dated Jun. 13, 2010.
European Extended Examination Search Report dated Sep. 16, 2010.

* cited by examiner

*Primary Examiner*—Amare Mengistu
*Assistant Examiner*—Premal Patel
(74) *Attorney, Agent, or Firm*—Perry + Currier, Inc.

(57) ABSTRACT

A novel method and apparatus for controlling a display of an electronic device is provided. In an embodiment, the device is a portable electronic device with the combined features of wireless email and telephony. The portable electronic device also includes a camera. The device includes a trackball which can be used to control the image shown in the viewfinder when the device is being used as a camera.

19 Claims, 16 Drawing Sheets

METHOD AND APPARATUS FOR CONTROLLING A DISPLAY IN AN ELECTRONIC DEVICE

FIELD

The present disclosure relates generally to electronic devices and more particularly relates to an apparatus and a method for controlling the display in an electronic device.

BACKGROUND

Portable electronic devices continue to get smaller and incorporate more functions. It is well known to incorporate the functions of a traditional personal digital assistant ("PDA") with wireless email capability into a single device, the Blackberry™ from Research in Motion of Waterloo, Canada being an example of a portable electronic device. It is also known to incorporate wireless voice functionality, music and video players into portable electronic devices.

As more features and functions are incorporated into portable electronic devices, it becomes very difficult to configure the controls and display of the device to maximize usability. Increasingly, cameras are being incorporated into portable electronic devices, which present unique challenges for enhancing device usability.

Indeed, in order to enhance the usability of the device, and yet maintain the small form factor that is desired to ensure portability, input devices on the device should serve multiple purposes. For example, the Blackberry™ 7100 portable electronic device, and its predecessors, comprises a trackwheel positioned on the side of the portable electronic device. The trackwheel can be actuated with the thumb, while the user holds the device and views the device display, to scroll through menus and can be inwardly depressed to make menu selections. Those skilled in the art appreciate that the trackwheel can be a very useful multi-purpose input device for a portable electronic device.

However, when incorporating a camera into a portable electronic device, the trackwheel becomes a problem, as the lens for the camera is typically situated on the rear of the portable electronic device. When the user grasps the portable electronic device to orient the thumb so as to operate the trackwheel, the user's index finger could obscure the camera lens as he or she grasps the portable electronic device. Indeed, those skilled in the art will recognize that the traditional form factor for a camera is radically different than for a cellular telephone or personal digital assistant, as the traditional camera form factor is designed for usability as it relates to the capturing of photographic images, whereas the form factor of a cellular telephone or personal digital assistant is designed for the usability of conducting telephonic communications or text-based display interactions.

Another aspect of the prior art is that features of camera functionality, such as zoom on/off, flash on/off, are generally initiated on prior art cameras via a separate physical button that is uniquely dedicated to that particular camera function. However, on a portable electronic device where the primary functions are communicating (e.g. telephone calls and email) the device lacks buttons that are dedicated as primary inputs for camera functions. Thus, it is important to use the existing keys and controllers on the device for the camera functions. However, use of such keys should be intuitive for the user.

While it is known to combine the features of a camera into a cellular telephone and/or a personal digital assistant, the usability of prior art devices still leaves much to be desired.

SUMMARY

An aspect provides a method for controlling the display of a portable electronic device having a camera function. The portable electronic device includes a light sensitive transducer for receiving a first image and a trackball for use as a user-input device. The method comprises:

setting a default zoom level;

activating a viewfinder by generating a second image on the display that corresponds to said image; the second image having a field of view that corresponds to the default zoom level;

receiving rolling input from the trackball; the input representing an instruction either to zoom-in or zoom-out from said field of view;

adjusting the zoom level based on whether the instruction indicated zoom-in or zoom-out; and, regenerating said second image, on the viewfinder, with an enlarged or reduced field of view according to the zoom level from the adjusting step.

The device can include at least one additional function in addition to the camera function, and the method can further comprise the step of, prior to the setting step, receiving a request to activate the camera application.

The at least one additional function can include at least one of wireless telephony, wireless email, and wireless instant messaging.

The rolling input of the trackball in a first direction can represent zooming-in, and the rolling input of the trackball in a second direction, opposite to the first direction, can represent zoom-out. In any event, the trackball can be rolled in any direction.

The method can further comprise the steps of receiving an input from the trackball corresponding to the trackball being depressed and capturing an image corresponding to the image on the viewfinder according to the zoom level.

The method can further comprise the step of generating an icon image of the trackball on the display that corresponds to whether the trackball is in a rest position or is in a rolling position.

The rest position can correspond to the zoom being at any one of a minimum zoom level, an intermediate zoom level and a maximum zoom level, and the method can further comprise the step of generating one of three icon images.

The icon corresponding to the minimum zoom level can indicate that only zooming-in is available. The icon corresponding to the intermediate level can indicate that both zooming-in and zooming-out are available. The icon corresponding to the maximum zoom level can indicate that only zooming-out is available.

The device can include a telephony or instant messaging application and further can comprise the step of presenting a notification screen overlaying the viewfinder indicating that an incoming communication is being received via the application.

The notification screen can include an identifier of an originator of the incoming communication, and the identifier can include a photograph of the originator, or instead of a photograph, it can include a graphic that is representative of the originator.

The notification screen can include an ignore field and an accept field. The ignore field can be highlighted by default when the notification screen is first activated.

Another aspect provides a portable electronic device comprising a processor interconnecting a trackball, a light-sensitive transducer, a display, a persistent storage device and volatile storage device. The processor can be configured to generate a viewfinder on the display. The viewfinder reproduces in real-time an image that is being received in real time via the light-sensitive transducer. The processor is further configured to receive rolling input via the trackball and to enlarge or reduce the image on the viewfinder depending on a direction of the rolling input.

The light-sensitive transducer can be an array of charge coupled devices ("CCDs").

The processor can be configured to receive a signal corresponding to the trackball being depressed, and, responsive to the signal, capture at least a portion of the image received by the light-sensitive transducer for saving on the persistent storage device. The field of view of the captured image correspond to the field of view of the image on the viewfinder.

The rolling input in a first direction can represent zooming-in, and rolling input in a second direction, opposite to the first direction, can represent zooming-out.

The processor of the device can further be configured to generate, in conjunction with the viewfinder, an icon image of the trackball on the display that corresponds to whether the trackball is in a rest position or is in a rolling position.

The rest position can correspond to the zoom being at any one of a minimum zoom level, an intermediate zoom level and a maximum zoom level.

The processor can be configured to generate three icons corresponding to the rest position. A first one of the icons corresponds to the minimum zoom level and can indicate that only zooming-in is available. A second one of the icons corresponding to the intermediate level can indicate that both zooming-in and zooming-out are available. A third one of the icons corresponding to the maximum zoom level can indicate that only zooming-out is available.

The device can include a telephony or instant messaging application. The processor can be further configured to generate a notification screen above the viewfinder indicating that an incoming communication is being received via the telephony or instant messaging application. The notification screen can include an identifier of an originator of the incoming communication, and the identifier can include a photograph of the originator. The notification screen can include an ignore field and an accept field. In an embodiment the ignore field is highlighted by default.

Another aspect provides a computer readable medium for storing a set of programming instructions according to any of the foregoing.

A novel method and apparatus for controlling a display of an electronic device is provided. In an embodiment, the device is a portable electronic device with the combined features of wireless email and telephony. The portable electronic device also includes a camera. The device includes a trackball which can be used to control the image shown in the viewfinder when the device is being used as a camera. In other embodiments, the trackball can be substituted for a touchpad.

BRIEF DESCRIPTION OF THE DRAWINGS

Embodiments, which are purely exemplary, will now be discussed with reference to the attached Figures in which.

DETAILED DESCRIPTION OF THE EMBODIMENTS

Figure 1:
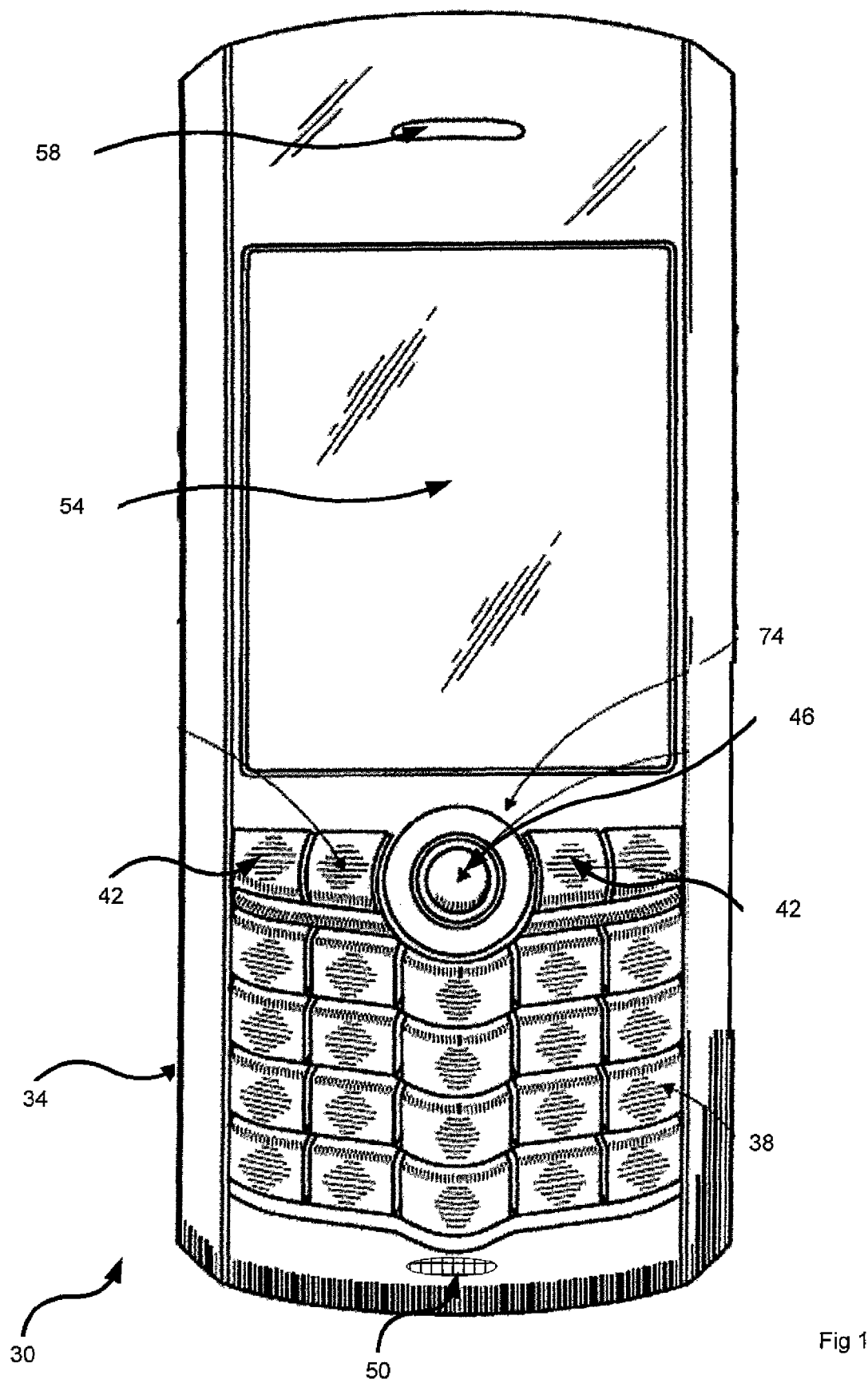
FIG. 1 is a schematic representation of a front view of a portable electronic device in accordance with an embodiment.

Referring now to FIG. 1, a front view of a portable electronic device in accordance with an embodiment is indicated generally at 30. In a present embodiment, device 30 includes the functionality of a wireless telephone, a wireless email paging device and a digital camera.

As best seen in FIG. 1, device 30 includes a housing 34 that frames a plurality of input devices in the form of a keyboard 38, a set of soft keys 42, a trackball 46 and a microphone 50. Housing 34 also frames a plurality of output devices in the form of a display 54 and a speaker 58.

Accordingly, a user of device 30 can interact with the input devices and output devices to send and receive emails, conduct voice telephone calls, manage appointments and contacts, browse the Internet, and perform such other functions as can be found on a known or as-yet unconceived electronic device such as device 30.

It is to be understood that device 30 is simplified for purposes of explanation, and that in other embodiments device 30 can include, additional and/or different functions and/or applications, and include input and output devices accordingly. Such other functionality can include music playing, audio recording and video playing. An example of a combined input/output device would include a Universal Serial Bus ("USB") port, a headset jack to connect a handsfree headset to device 30, or a Bluetooth™ (or equivalent technology) transceiver. Likewise, it will be understood from the teachings herein that certain functions included in device 30 can be omitted.

Figure 2:
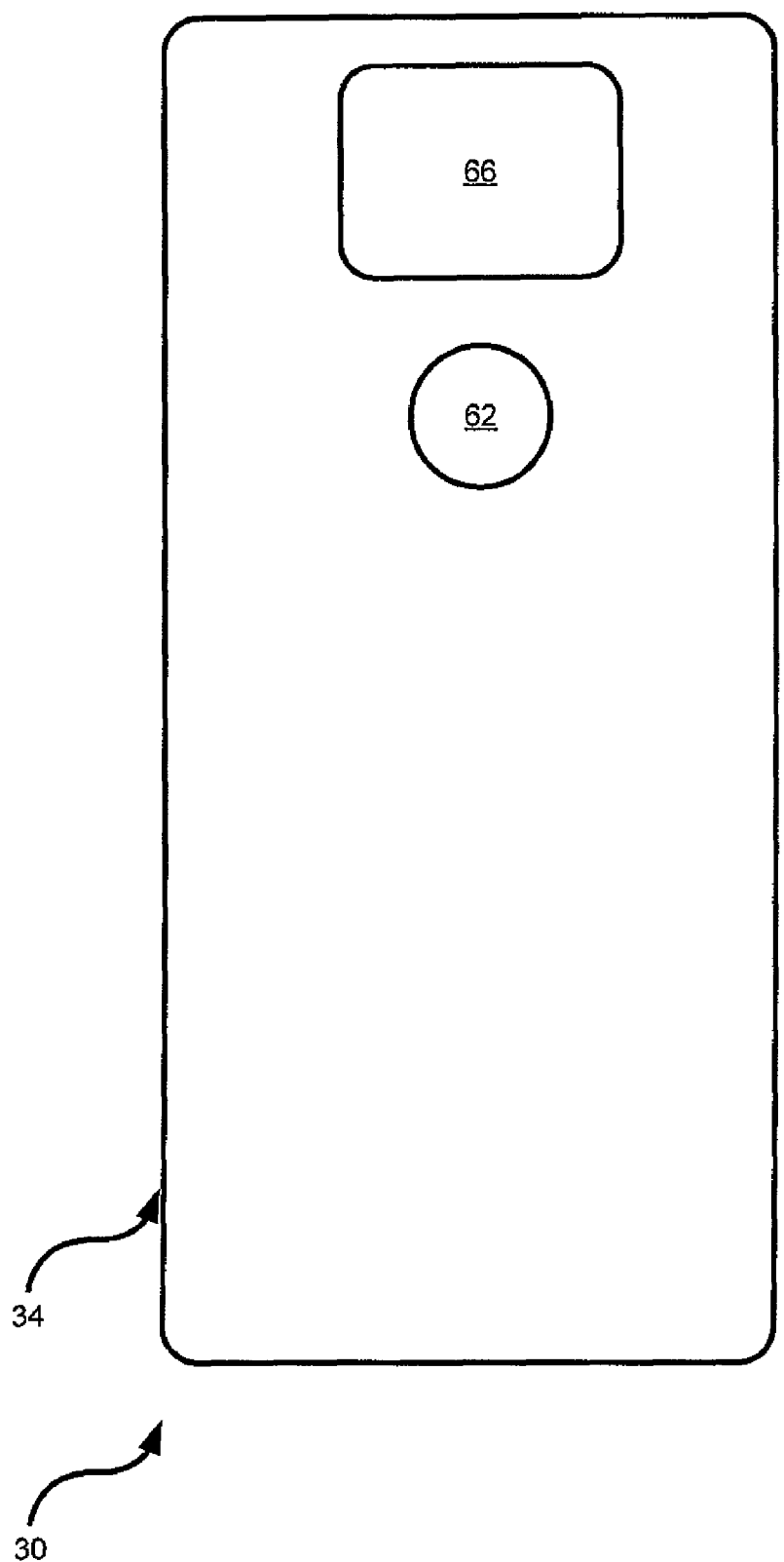
FIG. 2 is a schematic representation of a rear view of the portable electronic device of FIG. 1.

In a present embodiment, device 30 also includes a camera. Referring now to FIG. 2, a rear view of device 30 is shown. Device 30 thus also includes an additional input device in the form of a camera lens/light-sensitive transducer 62 and an additional output device in the form of a flash 66. Those skilled in the art will recognize that light-sensitive transducer 62 can be implemented as a plurality of light-sensitive transducers, disposed in an array, with each transducer corresponding to a pixel. An example of known light-sensitive transducers includes charge coupled devices (CCDs) which actually create an electronic signal of the image that is received via the light-sensitive transducer(s) of the camera.

At this point it can be pointed out that, in a present embodiment, the form factor of device 30 is constructed so that a user can grasp device 30 with either a left hand, or right hand, and be able to activate softkeys 42 and trackball 46 with the thumb. (While trackball 46 is configured for the thumb, it should be understood that users can use other digits on their hands as well). By the same token, lens and light-sensitive transducer 62 are disposed behind display 54 so that the index finger of the user, when wrapped around device 30, will not obscure the lens and thereby interfere with the use of device 30 as a camera. The positioning of light-sensitive transducer 62 behind display 54 also improves the usability of display 54 as a viewfinder when device 30 is acting as a camera, as the display 54 will present the scenery to the user that is directly behind display 54.

Figure 3:
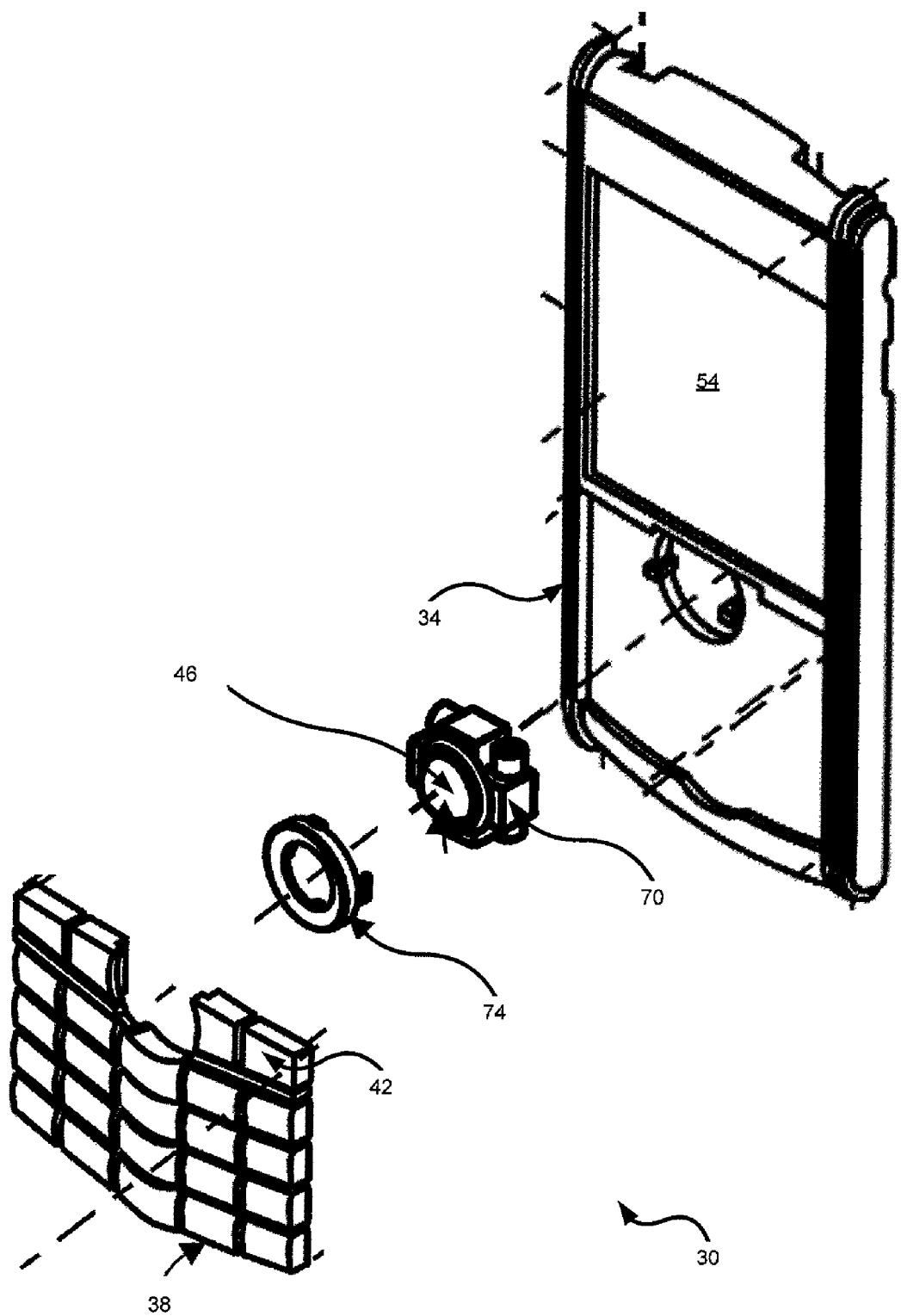
FIG. 3 is an isometric exploded view of certain components of the device of FIG. 1.

Referring now to FIG. 3, keyboard 38, soft keys 42, trackball 46, and a portion of housing 34 (framing display 54) are shown in greater detail. In a present embodiment, keyboard 38 is a reduced-QWERTY style keyboard, so that the width of device 30 permits device 30 to be grasped with one hand. However, other keyboard layouts and configurations are contemplated. Of note is that trackball 46 and soft keys 42 are situated below display 54, and above keyboard 38. Trackball 46 is disposed between soft keys 42. Trackball 46 and soft keys 42 are disposed so that their function(s) can change according to the context of the application or data that is being presented on display 54. Soft keys 42, in particular, are positioned so that the functions associated therewith can be presented, as appropriate, on display 54 in a position that intuitively corresponds with the location of the particular soft key 42.

Also shown in FIG. 3, is a transducer-housing 70 which presents a cavity that retains trackball 46 and permits trackball 46 to roll freely within. Trackball 46 can be moved in any direction to provide user-input, as will be discussed further below. Rotation of trackball 46 is sensed by transducers within transducer-housing 70. Trackball 46 can also be inwardly depressed and thereby provide input in substantially the same manner as soft keys 42 and any of the other keys on keyboard 38. Also included in FIG. 3 is a skirt 74, which mounts to transducer-housing 70 around the periphery of trackball 46.

Figure 4:
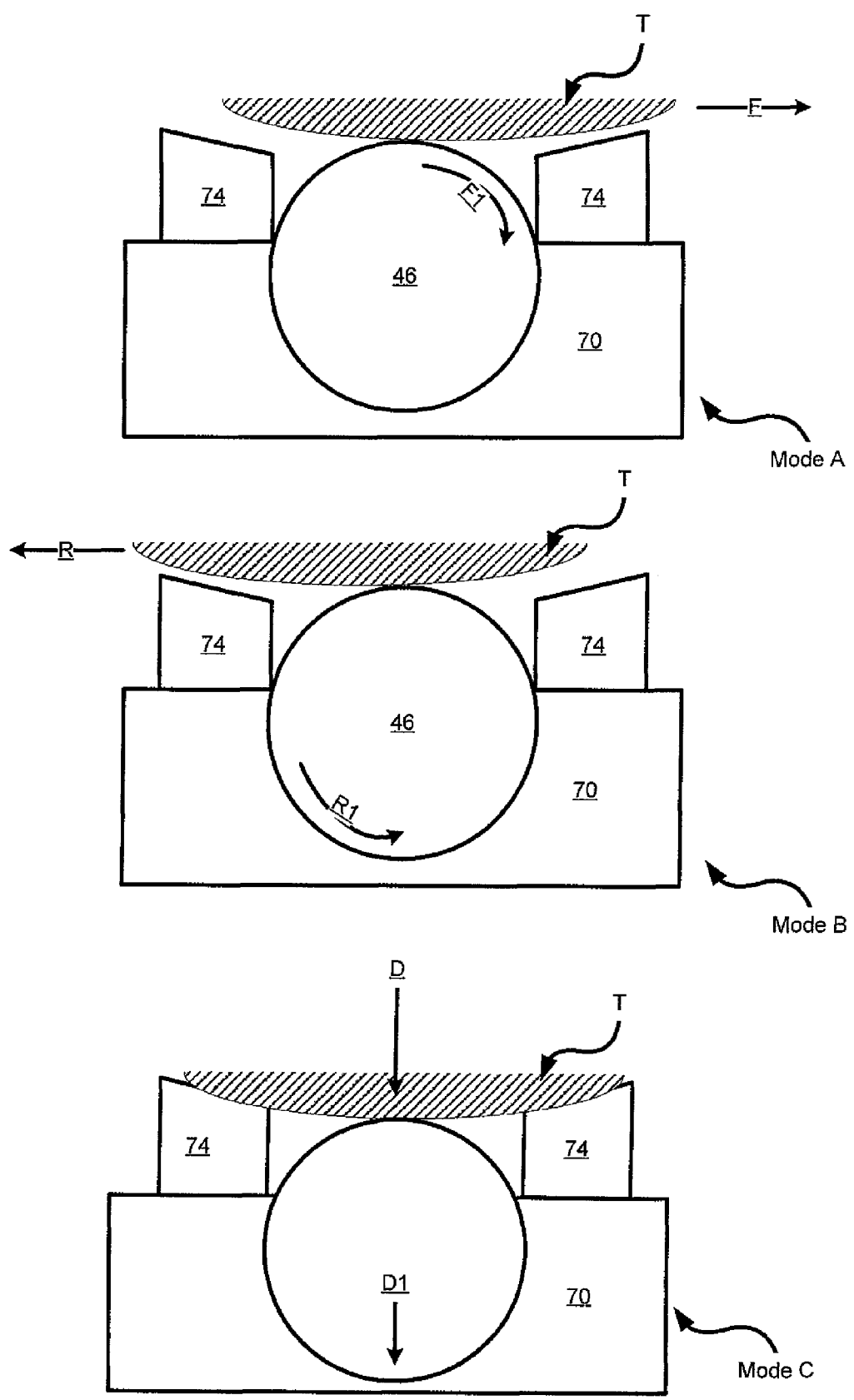
FIG. 4 shows the trackball of the device of FIG. 1 in greater detail and in three modes of operation.

Referring now to FIG. 4, trackball 46, transducer-housing 70 and skirt 74 are shown in greater detail in three different modes of operation. In mode A, a thumb T of a user is moving in the direction of arrow F causing trackball 46 to roll in the direction of arrow F1. Hereafter direction F1 will be referred to as forward direction F1. In mode B, thumb T is moving in the direction of arrow R causing trackball to roll in the direction of arrow R1, the opposite of direction forward direction F1. Hereafter direction R1 will be referred to as reverse direction R1. In mode C, thumb T is shown moving towards skirt 64 moving in the direction of arrow D thereby depressing trackball 46 and urging trackball 46 in the direction of arrow D1. Hereafter direction F1 will be referred to as depression direction D1. Those skilled in the art will now recognize that depression direction D1 is substantially the same effect that thumb T would have upon a key when depressing a key on keyboard 38.

It will be appreciated that modes A and B are essentially directions that are opposite to each other. It will also be appreciated that trackball 46 can be moved in any direction, and is not restricted to the directions shown in modes A and B. Modes A and B, and like rotations of trackball 46, can be used to move a cursor on display 54, or scroll through or browse content, or change the focus in a dialog box, that is displayed on display 54. By the same token, it will be appreciated that mode C can be used to make a final selection of content displayed on display 54.

Of note to the present embodiment is that the depth of skirt 74, and the taper that slopes inwardly towards trackball 46, is chosen to conform with the shape of thumb T, so as to leave trackball 46 in a relatively exposed position when trackball 46 is being rotated in modes A and B, so that thumb T does not contact skirt 74 during modes A and B. However, the depth of skirt 74 is also chosen so that, during mode C, when thumb T moves in depression direction D1, the exposed edge of skirt will engage with thumb T and thereby introduce friction to thumb T, and reduce the likelihood of the user inadvertently rotating trackball 46 while the user is actually attempting to depress trackball 46 via Mode C. This aspect will be discussed further below.

Figure 5:
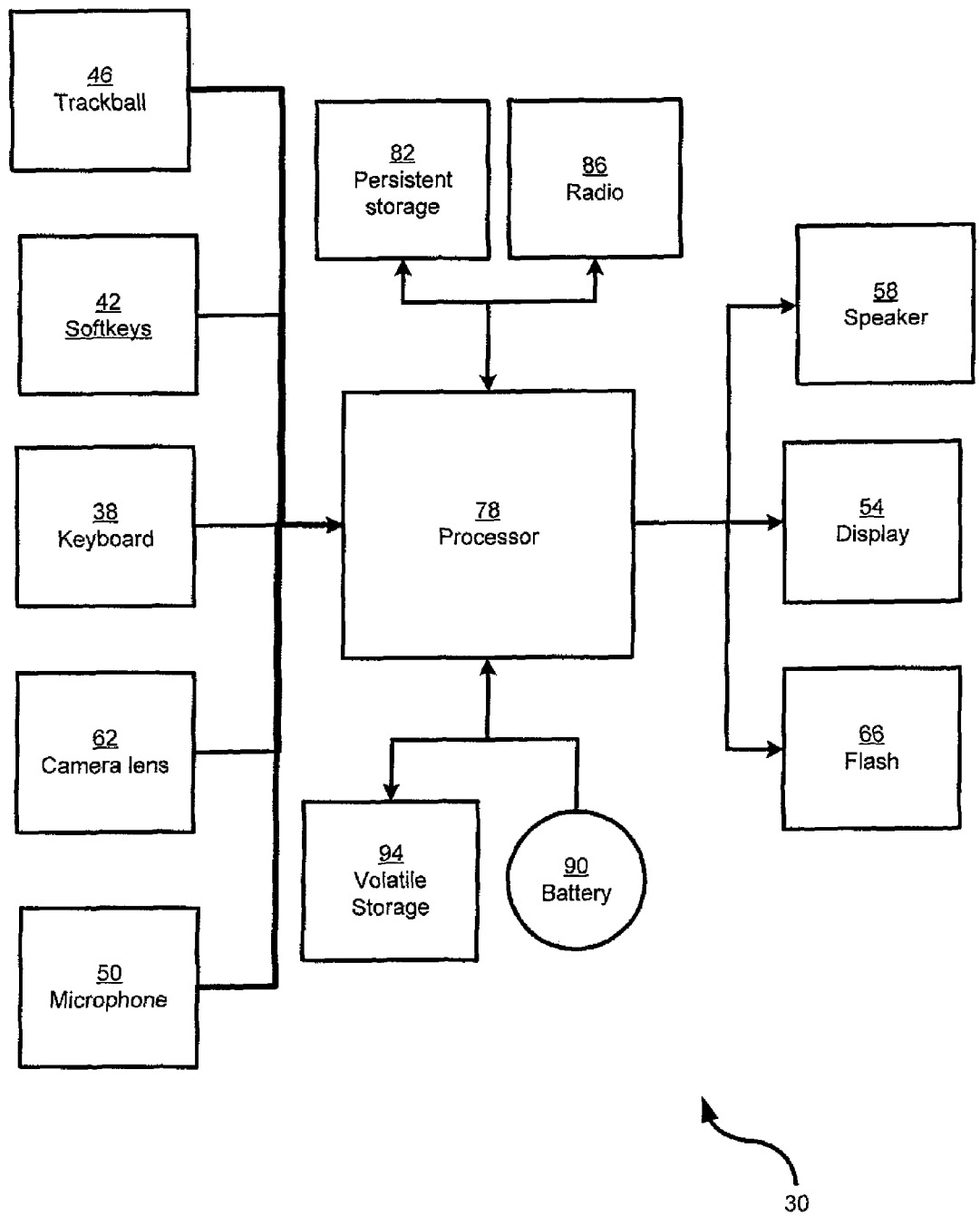
FIG. 5 is a block diagram of certain internal components of the device of FIG. 1.

Referring now to FIG. 5, a block diagram representing certain internal components of device 30 is shown. Device 30 thus includes a processor 78 which interconnects the input devices of device 30 (i.e. trackball 46, soft keys 42, keyboard 38, camera light-sensitive transducer 62 and microphone 50) and the output devices of device 30 (i.e. speaker 58, display 54 and flash 66). Processor 78 is also connected to a persistent storage device 82. (Persistent storage device 82 can be implemented using flash memory or the like, and/or can include other programmable read only memory (PROM) technology and/or can include read-only memory (ROM) technology and/or can include a removable "smart card" and/or can be comprised of combinations of the foregoing.) Device 30 also includes a wireless radio 86 disposed within housing 34 that connects wirelessly to one of a network of base stations to provide the wireless email, telephony and Web-browsing functionality of device 30.

Device 30 also includes a battery 90 which is typically rechargeable and provides power to the components of device 30. In a present, purely exemplary embodiment, battery 66 is a lithium battery having an operating voltage of between about 3.0 Volts minimum to about 42 Volts maximum. In FIG. 5, for simplicity battery 90 is only shown connected to processor 78, but it will be understood that battery 90 is connected to any component (e.g. the CCD associated light-sensitive transducer 62, radio 88, display 54 and flash 66) within device 30 that needs power to operate.

Device 30 also includes volatile storage 94, which can be implemented as random access memory (RAM), which can be used to temporarily store applications and data as they are being used by processor 78.

Figure 6:
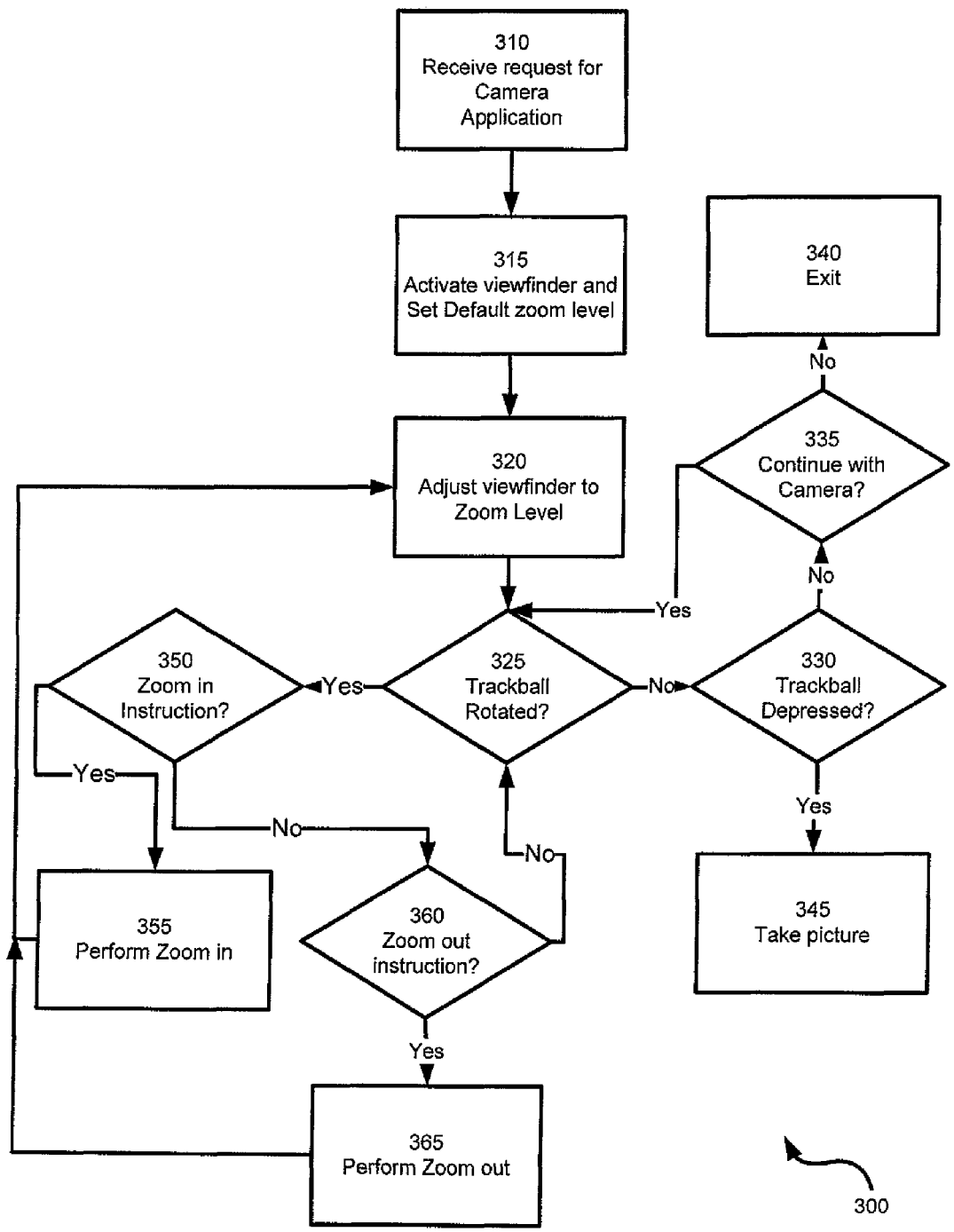
FIG. 6 is a flowchart depicting a method of controlling the display of a portable electronic device in accordance with another embodiment.

Referring now to FIG. 6 a method of controlling a display in an electronic device is represented in a flowchart and indicated generally at 300. To assist in understanding method 300, method 300 will be explained in terms of its performance using device 30 in the context of trackball 46. However, it is to be understood that this discussion is not be construed in a limiting sense, and that method 300 can be performed on devices other than device 30, and/or that method 300 can be varied.

Beginning at step 310, a request for the camera application is received. On device 30, this step can be effected in accordance with the menu screen in FIG. 7, which presents a number of applications to the user of device 30. The user can rotate trackball 46 to scroll through various applications, until the camera application is highlighted. Once highlighted, the user can depress trackball 46 to actually request the camera application. The user can select camera application in order to capture a digital image of a subject S. When processor 78 receives an input via trackball 46 that the user desires to use the camera application, method 300 will advance from step 310 to step 315.

Next, at steps 315 and 320, the viewfinder is activated at a default zoom level.

For device 30, the term "viewfinder" refers to a digital viewfinder, implemented as a software application executed by processor 78, in conjunction with transducer 62 and display 54. The software application mimics the function of an optical viewfinder that is used on a conventional camera. However, the teachings herein can be applied to an optical viewfinder that is used on a conventional camera, and/or a camera that has both an optical viewfinder and a digital viewfinder.

Also note that for device 30, the term "zoom" refers to a digital zoom, which is a zooming effect that is accomplished through a software application executing on processor 78. The software application processes images received from transducer 62 and generates corresponding images on display 54 in a manner that is known to those skilled in the art. However, it should also be understood that method 300 is applicable to devices that employ an "optical zoom", whereby the zooming effect is accomplished through the movement of the camera lens. Thus the teachings herein apply to digital zooming, optical zooming and combinations thereof.

It will be appreciated that between steps 310 and 315, the function of trackball 46 changes instantly, at least from the perspective of the user, from a navigation input device to a zoom-control input device. Thus, during the remainder of the performance of method 300, the behavior of device 30 mimics a prior art camera with a dedicated input device (i.e. trackball 46) for controlling zoom level, and thus the user's experience is substantially similar to what it would be when the user operates a prior art camera.

In a present embodiment, the default zoom level is set to 2.6× (two-point-six times). Steps 315 and 320 are represented FIG. 8, where display 54 is shown presenting a viewfinder 100. Viewfinder 100 is implemented by configuring processor 78 to receive an image of subject S through light-sensitive transducer 62 and then generate a representation of that image on display 54. In this example, the size of subject S on viewfinder 100 is consistent with the zoom level of 2.6×, and accordingly, not all of subject S is shown occupying the area of the viewfinder on display 54.

In addition to viewfinder 100, processor 78 is also configured to control display 54 so as to present a status bar 104 thereon. Status bar 104 includes a zoom level indicator 108 and a flash icon 112. Zoom level indicator 108 is thus shown in FIG. 8 with the value "2.6×" indicating the zoom level. Flash icon 112, when active, indicates that flash 66 will fire when the actual picture is taken. Status bar 104 also includes a picture count indicator 116, indicating the number of pictures that can be taken and stored in the memory of device 30. Status bar 104 also includes a shutter control indicator 120.

Shutter control indicator 120 is rendered on display 54 in-line with trackball 46, indicating that actuation of trackball 46 will control the operation of the camera. Shutter control indicator 116 includes an icon in the form of a picture of a camera in the center, representing that if the user depresses trackball 46, in a manner consistent with mode C, then a picture of the subject within viewfinder 100 will be taken and stored.

Shutter control indicator 120 is also rendered as a solid circle within a hollow circle, to represent that rolling of trackball 46, in a manner consistent with modes A or B (or the like) will control the camera so as to zoom in to, or zoom out from, subject S. Shutter control indicator 120 is situated substantially at the intersection of the horizontal and vertical midlines of status bar 104. This location represents the fact that trackball 46 is at rest and is not being rolled. It will now be appreciated that the appearance of shutter control indicator 120 mimics the overall appearance of trackball 46 thereby intuitively indicating the function of trackball 46 in relation to the camera.

Next, at step 325, a determination is made as to whether the trackball has been rotated. If no, then method 300 advances to step 330 at which point a determination is made as to whether trackball 46 has been depressed. If "no" method 300 advances from step 330 to step 335 and a determination is made as to whether to continue with the camera function. A "no" determination could be made at step 335 for a variety of reasons. For example, an incoming call could automatically cause the camera function to be discontinued in favor of an application on device 30 that manages incoming calls. Alternatively, the user of device 30 could input a command using softkeys 42, or keyboard 38, indicating that the user wished to exit the camera application.

Returning to step 330, if, however, trackball 46 is depressed in a manner consistent with mode C, then method 300 advances from step 330 to step 345 at which point an image will be captured of the subject as it appears within viewfinder 100.

Figure 8:
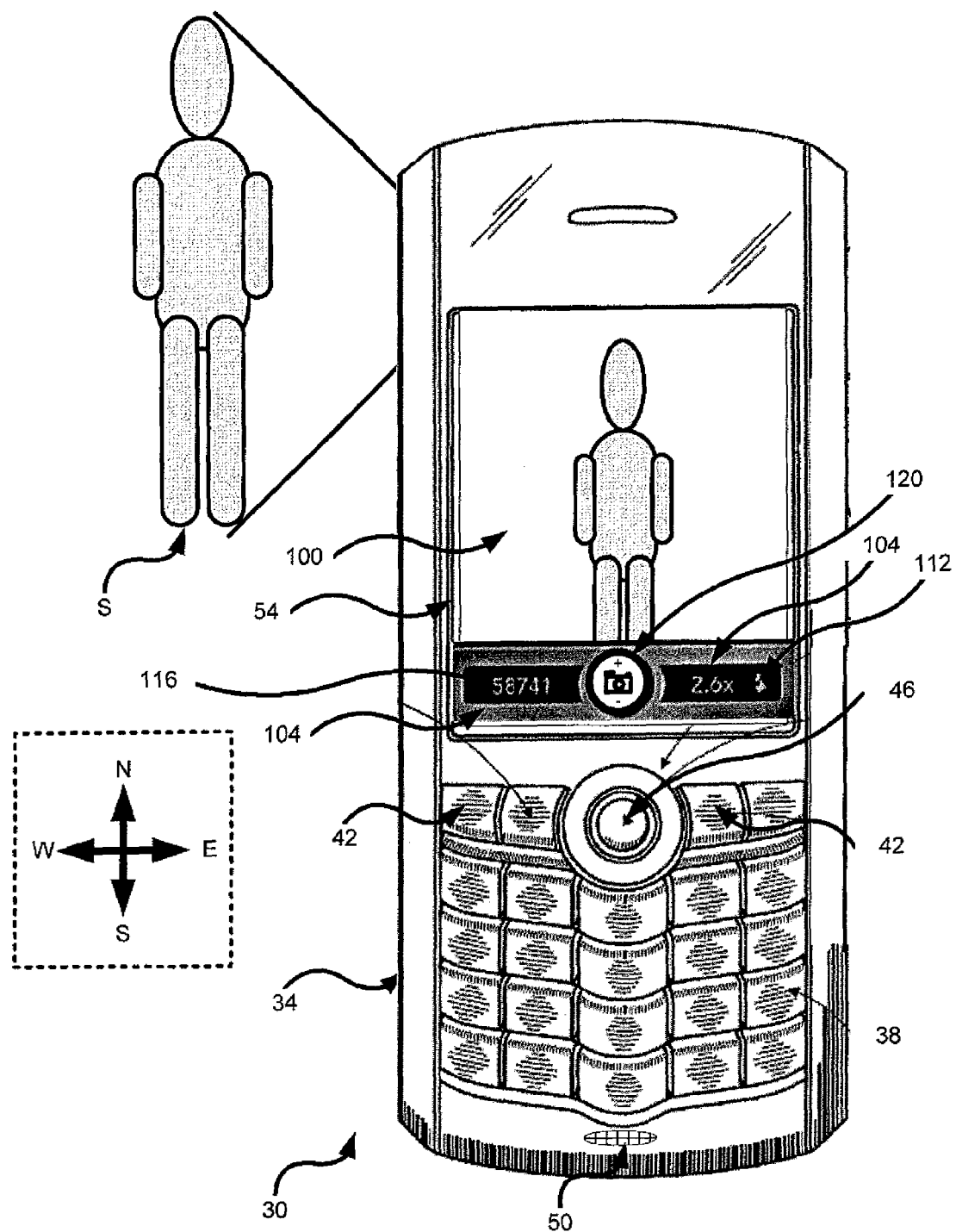
FIG. 8 shows the subject in FIG. 7 through the viewfinder of the device of FIG. 7.

Returning to step 325, if, however, trackball 46 is rotated then method 300 advances from step 325 to step 350 At step 350, a determination is made as to whether the rotation of trackball 46 indicated an instruction to "zoom in". In a present embodiment, a determination of "yes" is made at step 350 when trackball 46 is rotated in manner consistent with mode A, whereby direction F points towards shutter control indicator 120. Put in other words, if the directions that can be rotated by trackball 46 are consistent with the cardinal points of the compass, (as shown in FIG. 8) then a "yes" determination is made when trackball 46 is rotated in the "north" direction. (Alternatively, or in addition, a determination of "yes" could be made at step 350 when track ball 46 is rotated towards the "east" direction.)

If the determination at step 350 is "no", then at step 360, a determination is made as to whether rotation of trackball 46 indicated an instruction to "zoom out". In a present embodiment, a determination of "yes" is made at step 350 when trackball 46 is rotated in manner consistent with mode A, whereby direction R points towards keyboard 38. Put in other words, if the directions that can be rotated by trackball 46 are consistent with the cardinal points of the compass, then a "yes" determination is made when trackball is rotated in the "south" direction. (Alternatively, or in addition, a determination of "yes" could be made at step 350 when track ball 46 is rotated towards the "west" direction.)

Figure 9:
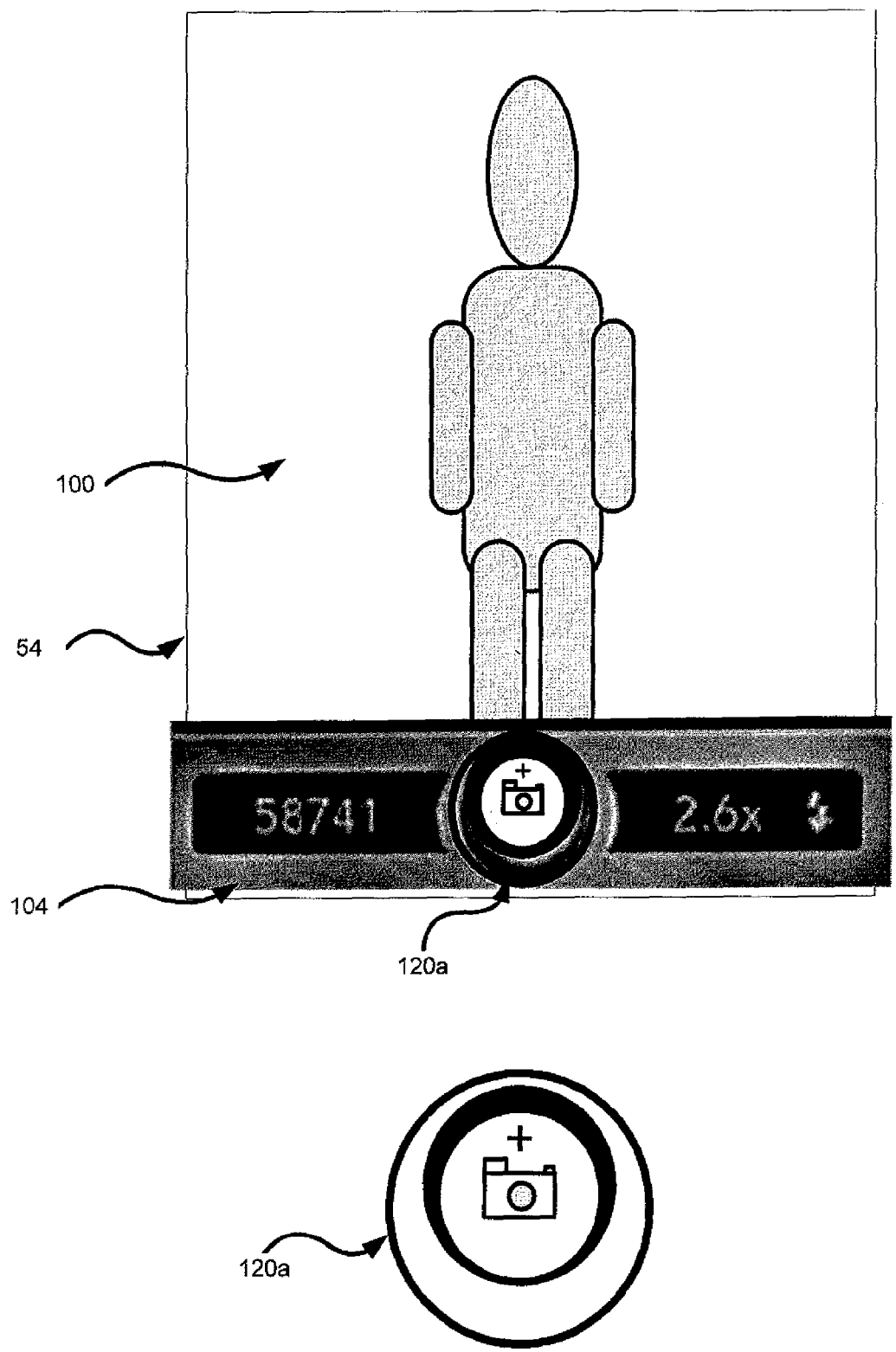
FIG. 9 shows the control of the display of the device of FIG. 7 during performance of part of the zooming-in function.

Steps 355 and 365 are thus reserved for the performance of the actual zoom in or zoom out functions, respectively. As the initial part of step 355, when trackball is rotated in the north direction, shutter control indicator 120 changes in appearance and appears in the form of icon 120a as shown in FIG. 9. Shutter control icon 120a appears within status bar 104 at a position that is above the horizontal midline of status bar 104, which indicates to the user that the input of the trackball being rolled in the "north" direction is being received. Icon 120*a* is also characterized by a bulge at the top of its outer periphery, so that the line thickness at the bulge is greater than the line thickness at the bottom of the outer periphery. Additionally, a "plus" sign appears in icon 120*a*, indicating that a command for "zooming in" is being received.

Figure 10:
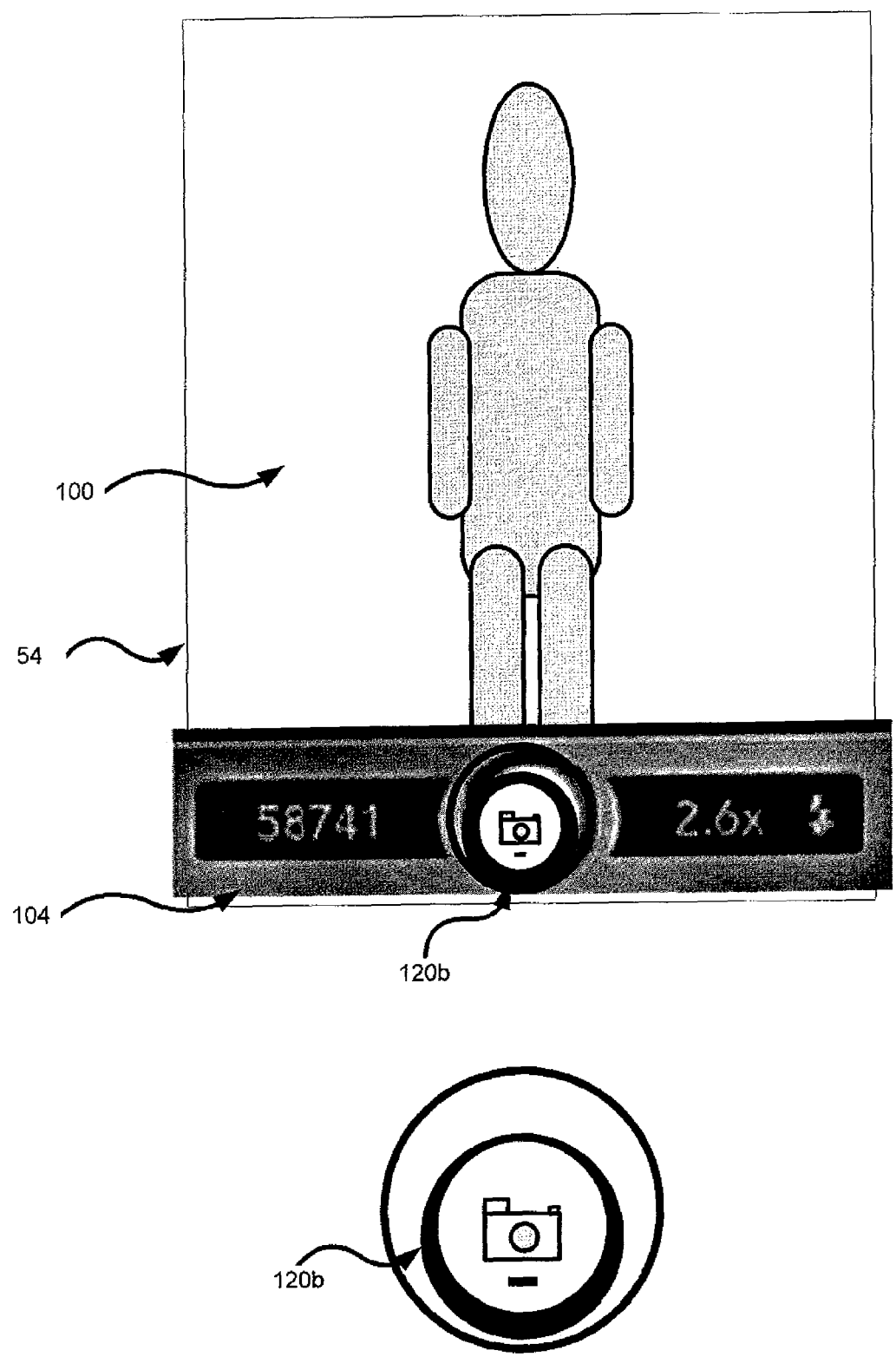
FIG. 10 shows the control of the display of the device of FIG. 7 during performance of part of the zooming-out function.

By the same token, as the initial part of step 365, when trackball is rotated in the south direction, shutter control indicator 120 changes in appearance and appears in the form of icon 120*b* as shown in FIG. 10. Shutter control icon 120*b* appears within status bar 104 at a position that is below the horizontal midline of status bar 104, which indicates to the user that the input of the trackball being rolled in the "south" direction is being received. Icon 120*b* is also characterized by a bulge at the bottom of its outer periphery, so that the line thickness at the bulge is greater than the line thickness at the top of the outer periphery. Additionally, a "negative" sign appears in icon 120*b*, indicating that a command for "zooming out" is being received.

Figure 11:
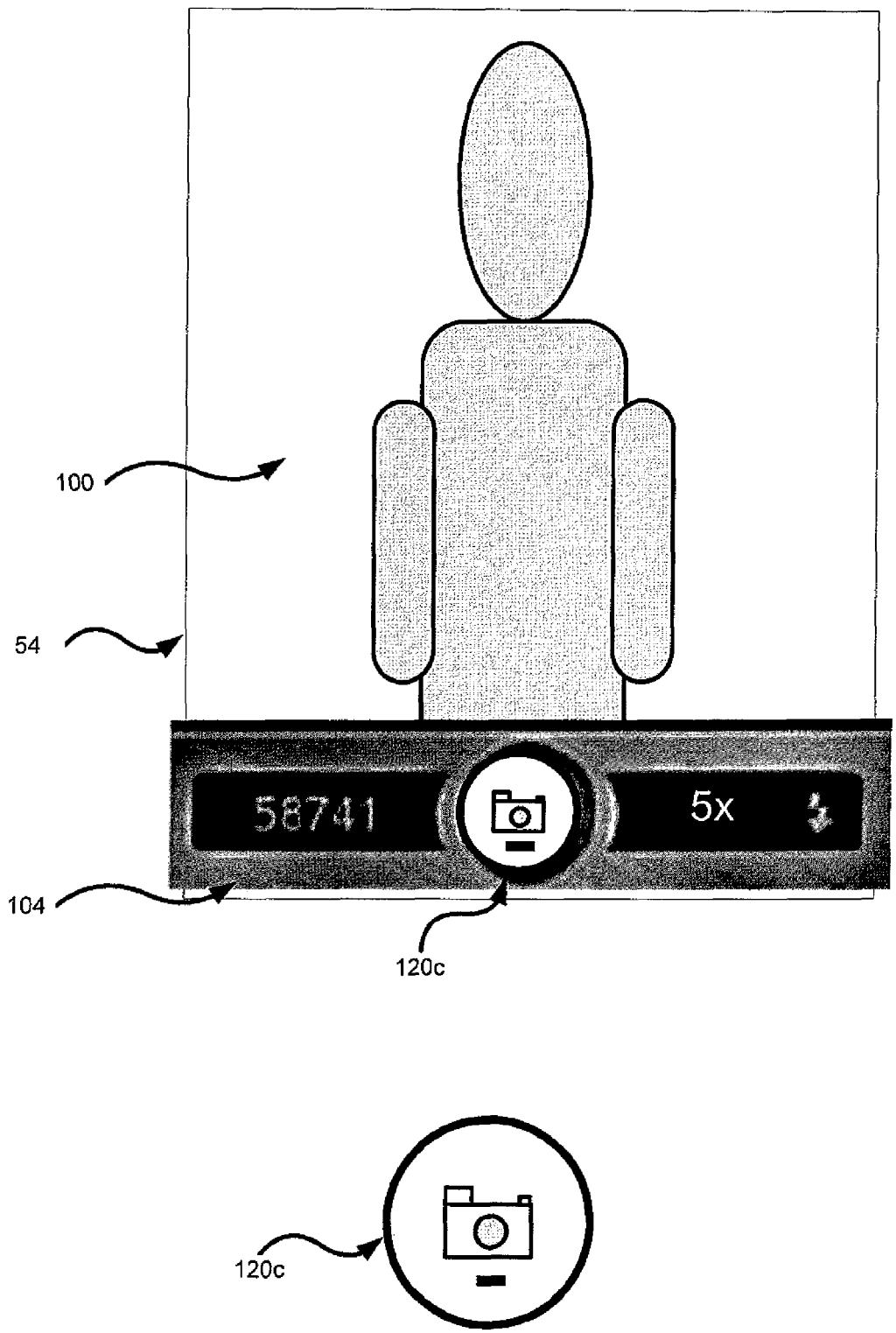
FIG. 11 shows the control of the display of the device of FIG. 7 at the conclusion of performing the zooming-in function.

The conclusion of the zooming-in at step 355 (and by extension the return to step 320) is represented in FIG. 11. In FIG. 11, zoom level indicator now reads "5×", which in the present embodiment is the maximum level of zooming-in for device 30. Subject S thus appears within viewfinder 100 to be closer. Icon 120*c* now appears at the intersection of the horizontal and vertical midlines of status bar 104. The location of icon 120*c* represents that trackball 46 is now at rest. Icon 120*c* otherwise appears the same as icon 120, except that icon 120*c* includes a "negative" sign at the bottom, indicating that no further "zooming-in" is possible, and that "zooming-out" is now the only option. Should the user attempt to continue to "zoom-in", then, optionally, processor 78 can be configured to render icon 120*c* to appear above the horizontal midline of status bar 104 (in the same position as icon 120*a*), but no further zooming-in will actually occur. Instead, the "negative" sign indicator will remain as a visual cue to the user that no further zooming-in is possible. For further assistance, the user can examine zoom level indicator 108, which informs the user of the current zoom level. The user can ascertain that, while icon 120 changes in appearance during rolling of trackball 46, the zoom level does not change. The user is thus provided with visual feedback that device 30 is receiving input, but is not able to respond since the extreme zoom level has been reached.

Figure 12:
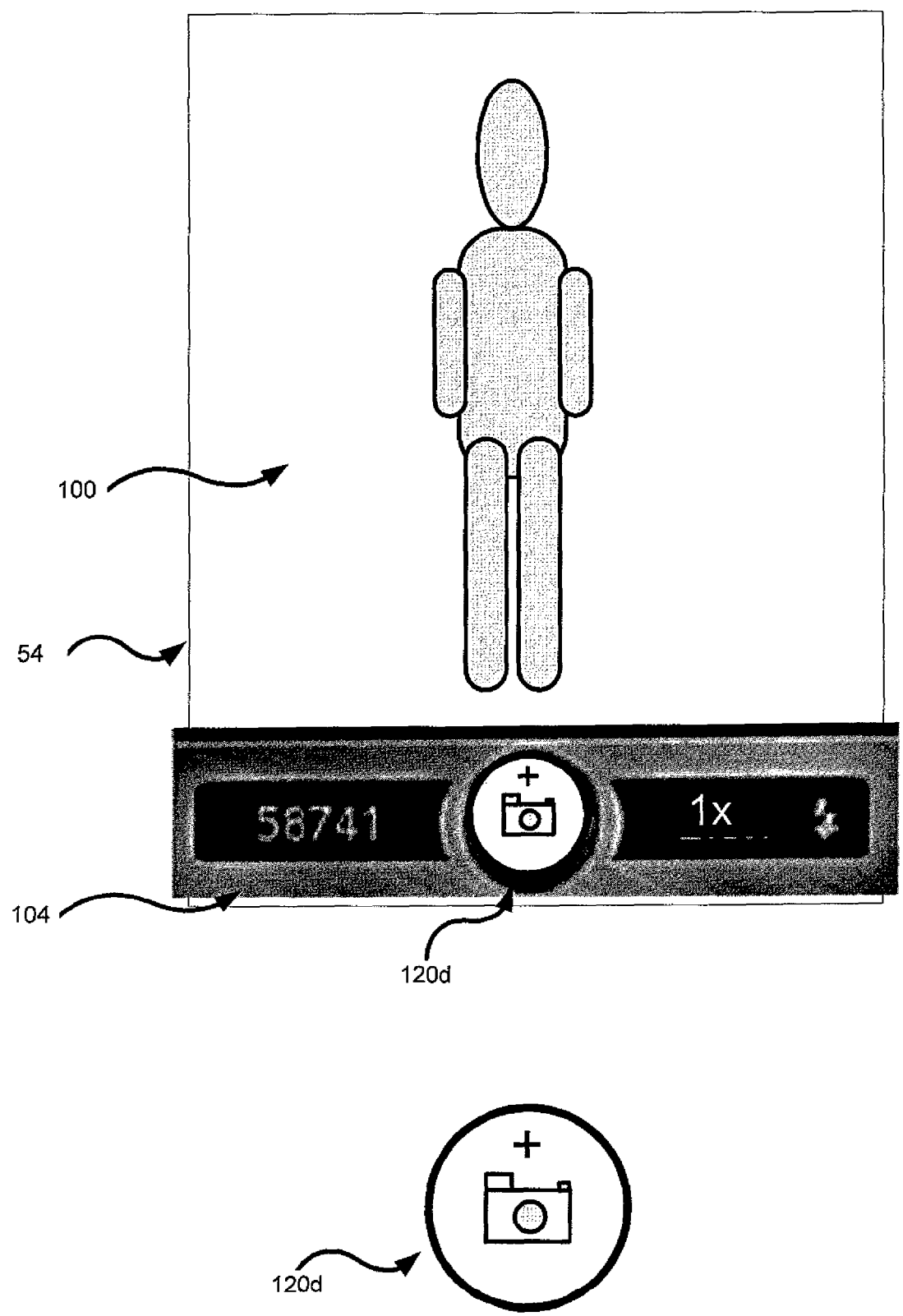
FIG. 12 shows the control of the display of the device of FIG. 7 at the conclusion of performing the zooming-out function.

Likewise, the conclusion of the zooming-out at step 365 (and by extension the return to step 320) is represented in FIG. 12. In FIG. 12, zoom level indicator now reads "1×", which in the present embodiment is the minimum level of zoom for device 30. Subject S thus appears within viewfinder 100 to be farther away. Icon 120*d* now appears at the intersection of the horizontal and vertical midlines of status bar 104. The location of icon 120*d* represents that trackball 46 is now at rest. Icon 120*d* otherwise appears the same as icon 120, except that icon 120*c* includes a "plus" sign at the top, indicating that no further "zooming-out" is possible, and that "zooming-in" is now the only option. Should the user attempt to continue to "zoom-out", then, optionally, processor 78 can be configured to render icon 120*d* below the horizontal midline of status bar 104 (in the same position as icon 120*b*), but no further zooming-in will actually occur. Instead, the "plus" sign indicator will remain as a visual cue to the user that no further zooming-out is possible. Again, for further assistance, the user can examine zoom level indicator 108. The user can ascertain that, while icon 120 changes in appearance during rolling of trackball 46, the zoom level does not change. The user is thus provided with visual feedback that device 30 is receiving input, but is not able to respond since the extreme zoom level has been reached.

While the foregoing embodiments contemplate three levels of zooming, it should be understood that any number of levels of zooming can be implemented, as desired. Three levels have, however, in the present embodiment determined to achieve a high level of usability. The foregoing embodiment also contemplates that only one zoom level (either zooming in or zooming out) is effected for a given roll of trackball 46, so as not to accidentally go straight from 1× to 5×, but this is not a necessity. This aspect of the embodiment can be understood by referring back to FIG. 4, where in order to achieve a "yes" determination at step 350, trackball 46 must rotated a minimum distance in forward direction F1. However, once that minimum distance is exceed, step 350 is not completed until trackball 46 returns to a rest position and stops rotating—regardless of the actual distance (or number of degrees) that trackball 46 is actually rotated. The minimum distance helps ensure that an accidental roll of trackball 46 during depressing of trackball 46 is not misconstrued as being a command to zoom-in or zoom-out. Likewise, in order to achieve a "yes" determination at step 360, trackball 46 is rotated a minimum distance in reverse direction R1. However, once that minimum distance is exceed, step 350 is not completed until trackball 46 stops rotating in that direction—regardless of the actual distance (or number of degrees) that trackball 46 is actually rotated.

At this point it is to be emphasized that composing the picture of subject S is complex and requires much concentration on the part of the user. There is therefore a need for a high degree of usability of device 30. During composition of the picture, the user may have to deal with awkward light conditions, a moving subject, and interference from other objects appearing between light-sensitive transducer 62 and subject S. Other difficulties can arise when composing a picture. Accordingly, it is presently desired to configure the sensitivity of rolling of trackball 46 to be sufficiently low so that zooming is not accidentally triggered by depressing trackball 46 when taking a picture. In a present embodiment, the configuration of skirt 74, trackball 46 and transducer-housing 70 have been arranged, according to the structure shown FIG. 4, so that as method 300 operates between steps 325 and 330, as described above, the likelihood of the user miscommunicating his or her intentions to processor 78 is reduced, thus improving the usability of device 30 for the user. That is to say, the configuration allows the user to unambiguously interact with trackball 46 so as to explicitly provide either zooming-in or zooming-out commands, or to allow the user to explicitly depress trackball 46 and thereby take the picture as presently composed within viewfinder 100.

Figure 13:
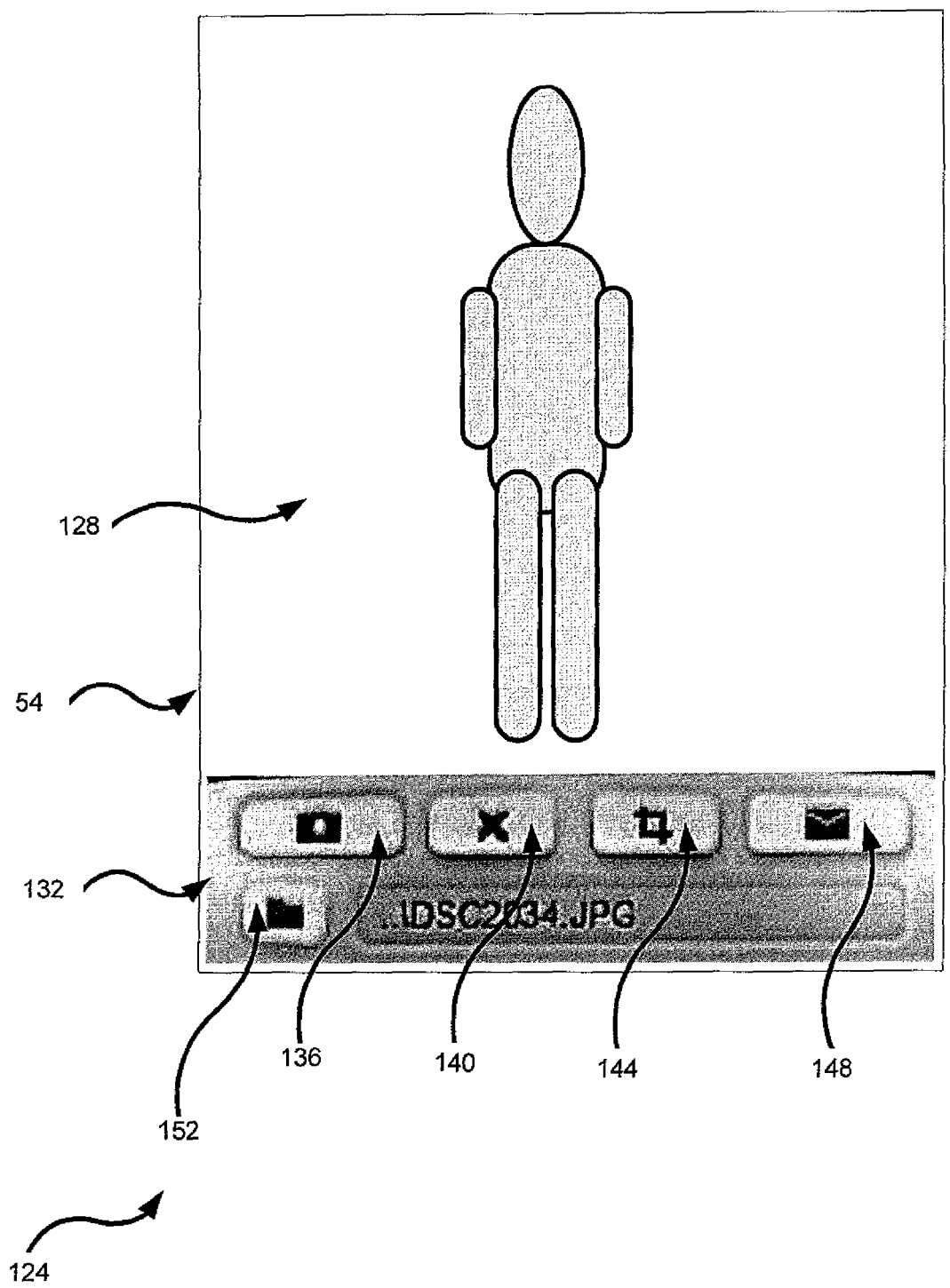
FIG. 13 show a preview screen that can be generated in accordance with another embodiment.

In another embodiment, a novel preview screen for viewing a photograph previously taken with an electronic device, such as device 30, is provided. The novel screen according to the embodiment is indicated generally at 124 in FIG. 13. Preview screen 124 can be generated by processor 78 on display 54 after, for example, step 345 of method 300 is performed. Continuing with the specific example, screen 124 in FIG. 13 is shown with the picture of subject S that was composed according to FIG. 12. Thus preview screen 124 includes a picture window 128 which shows subject S, as composed in viewfinder 100 in FIG. 12. Preview screen 124 also includes a preview status bar 132 which replaces status bar 104.

Preview status bar 132 includes five icons, which correspond to five different options that are available to the user. These icons are: return-to-viewfinder 136; delete-picture 140; crop 144; send 148; and file 152. When preview screen 124 is presented after performance of method 300, the picture (within picture 124) will have been saved in the file location adjacent to the file icon, file 152. Return-to-viewfinder 136, as the name implies, leaves the picture shown in picture window 128 saved in persistent storage 82 according to the file name and location found adjacent to file 152. Selecting return-to-viewfinder 136 can be used to begin method 300 anew. Delete-picture 140 can be used to delete the picture shown in picture window 128 from persistent storage device 82. Once delete-picture 140 is selected, the picture is deleted and then method 300 begins anew. Crop 144 can be used to select certain portions of the picture stored in picture window 128, and such portions can be saved as new pictures on persistent storage device 82 and/or can be associated with one or more contacts in a contact-manager application that executes on device 30. Send 148 can be used to send the picture within picture window 128 via email, multimedia messaging service (MMS) or the like using the wireless email capabilities of device 30. File 152 can be used to view and/or edit the file name of the picture, and/or browse through other photographs stored on persistent storage device 82 and load them for viewing within preview screen 124.

Individual icons on the preview status bar 132 can be selected by using trackball 46 to sequentially highlight each one of the icons until the desired icon is highlighted and then depressing trackball 46 to actually select the function associated with that icon.

In another embodiment, a crop selection screen that can be accessed via selection of crop icon 144 is provided. The novel screen according to the embodiment is indicated generally at 156 in FIG. 14. In a present embodiment, crop selection screen 156 can be used to create a cropped picture that can be saved in association with a contact in a contact manager application on device 30. The cropped picture will typically be the face of an individual, although this is not a necessity. Crop selection screen 156 includes a selection window 160 that is, in turn, comprised of a selection sub-window 164 and a context sub-window 168. Selection sub-window 164 is circular and is transparent, and preferably completely transparent with a visible, delimiting border as shown. Context sub-window 168 is rectangular, and occupies the full height, but not the full width of display 54. Context sub-window is semi-transparent, and preferably less transparent than selection sub-window 164. Crop selection screen 156 is optimized to allow a user to crop a picture so as to select, for saving the face, or primarily the face, of a subject in the picture. Crop selection screen 156 is also optimized for usability, to simplify the cropping function for a user when selection screen 156 is implemented on device 30 or the like. The capture of facial images of subjects is desired so that those same captured facial images can be saved as a field within a record of a contact manager application operating on device 30.

By way of background, the record in the contact manager is associated with a full set of contact and address details for the subject that has been photographed. This, again, can enhance the overall usability of device 30 as the user can scroll through photographs in the contact manager application in order to select a desired person to telephone or email or otherwise contact using device 30. By the same token, a "visual" identification feature (e.g. a "caller-ID") can be configured in device 30 whereby an incoming call (or other communication such as an email or an instant messaging application) from the subject to the device 30 will cause the stored picture of the subject to be displayed on display 54 and thereby assist the user of device 30 in identifying the source of the incoming communication and allow the user to react accordingly.

Figure 14:
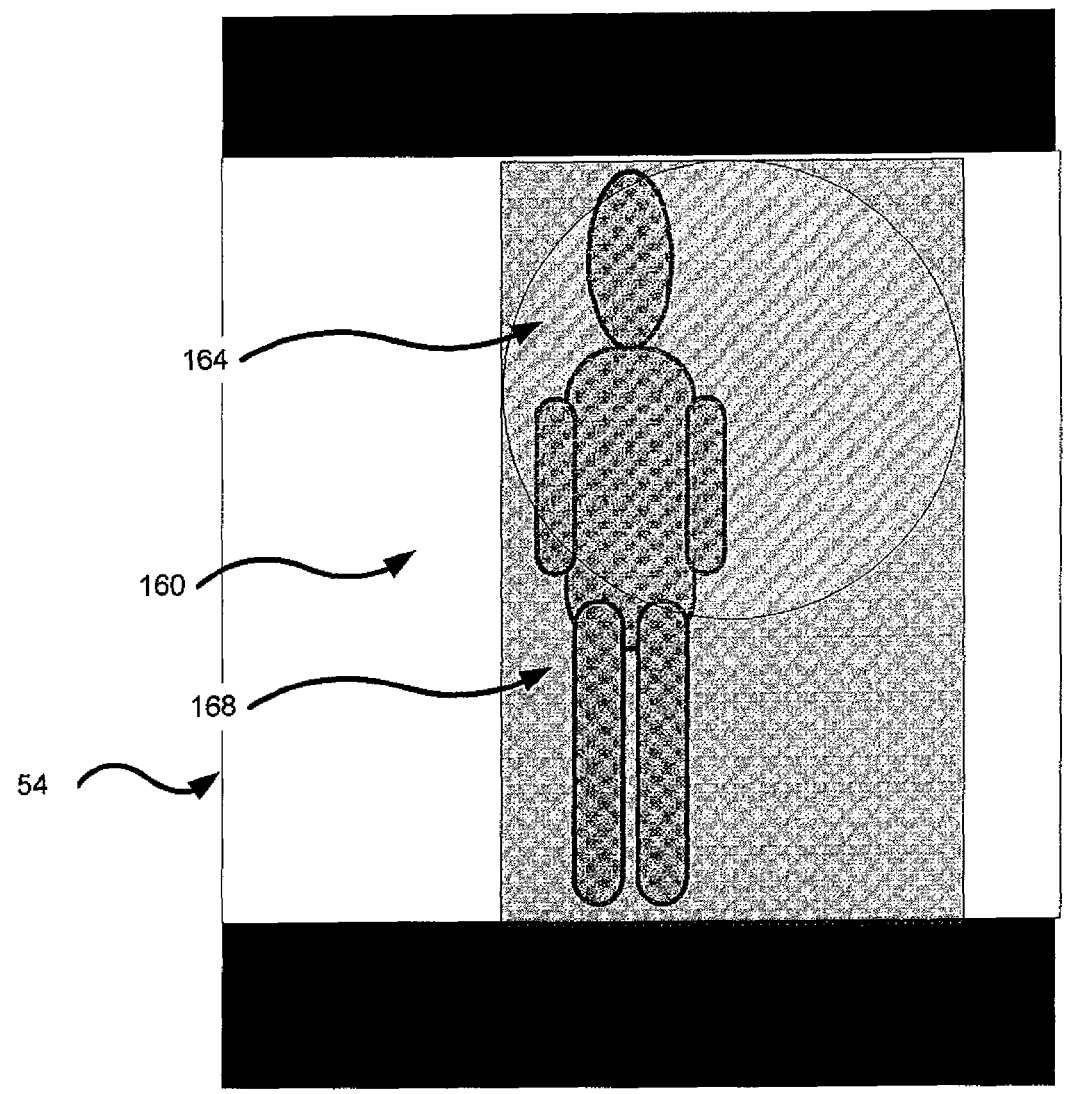
FIG. 14 shows a crop selection screen that can be generated in accordance with another embodiment.
Figure 14:
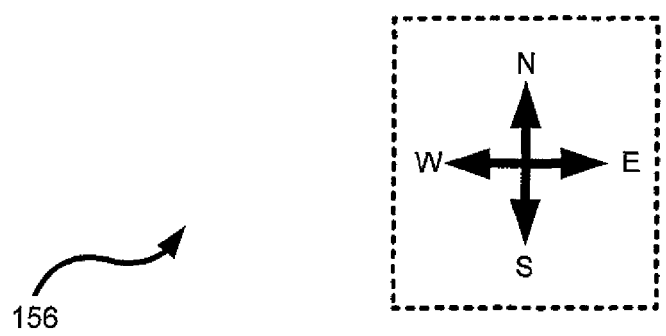
Figure 15:
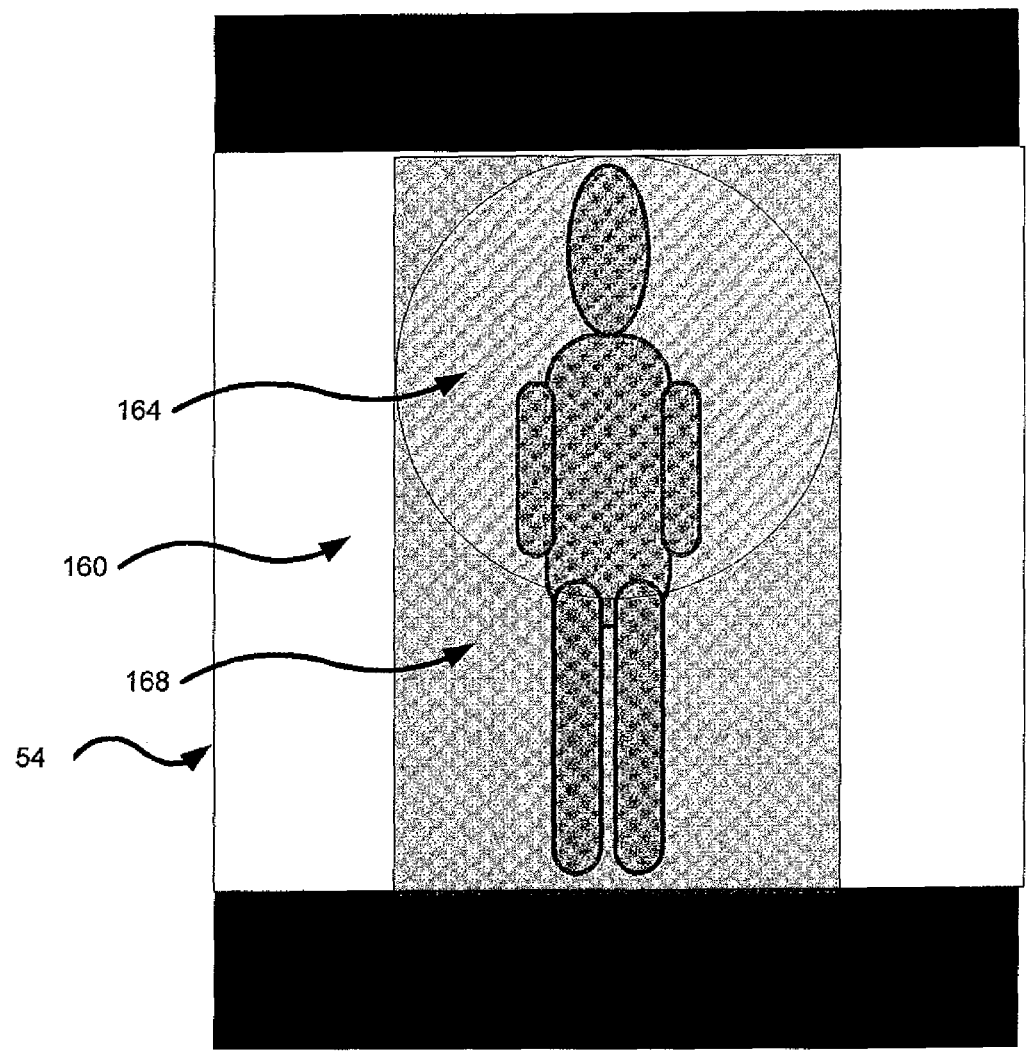
FIG. 15 shows the crop selection screen of FIG. 14 but with the selection window moved; and, FIG. 16 shows an incoming call screen in accordance with another embodiment.
Figure 15:
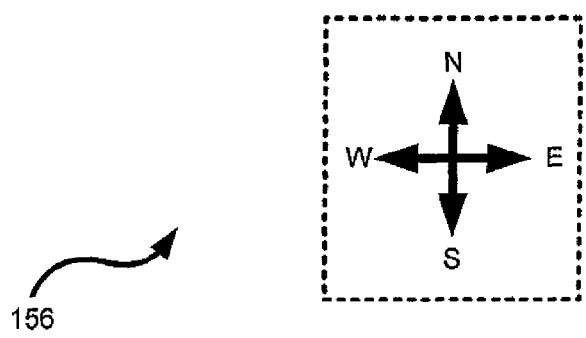

When a user accesses screen 156, the user will have the option of moving selection window 160 "east" or "west" (in relation to the view in FIG. 14) using trackball 46. As can be seen in FIG. 14, selection sub-window 164 does not frame the face of subject S so that the face of subject S appears in the center of selection sub-window 164. Trackball 46 can be used to move selection sub-window 164 to the left, as shown in FIG. 15, and thereby position the face of subject S in the center of selection sub-window 164. Advantageously, context sub-window 168 allows the user to view the portions of the picture that surround the selected portion, so that during movement of selection window 160 via trackball 46, the user has further information to allow the user to select the desired portion of the picture. Once selection window 160 is positioned in the desired location, the user can depress trackball 46 (or provide an equivalent input) to actually crop the picture according to the selection.

In the foregoing embodiment, selection sub-window 164 is circular and is transparent, while context sub-window 168 is rectangular, and occupies the full height, but not the full width of display 54. It should be understood that selection sub-window 164 can be any shape, including square or rectangular, within the context sub-window 168. Context sub-window 168 can also be of different shapes and can be smaller than selection sub-window 164. Likewise, selection sub-window 164 can be omitted altogether, so that the selection window corresponds to the area covered by context sub-window. It can also be desired to configure device 30 so that the user can predefine the shapes and/or sizes of selection sub-window 164 and/or context sub-window 168.

Figure 7:
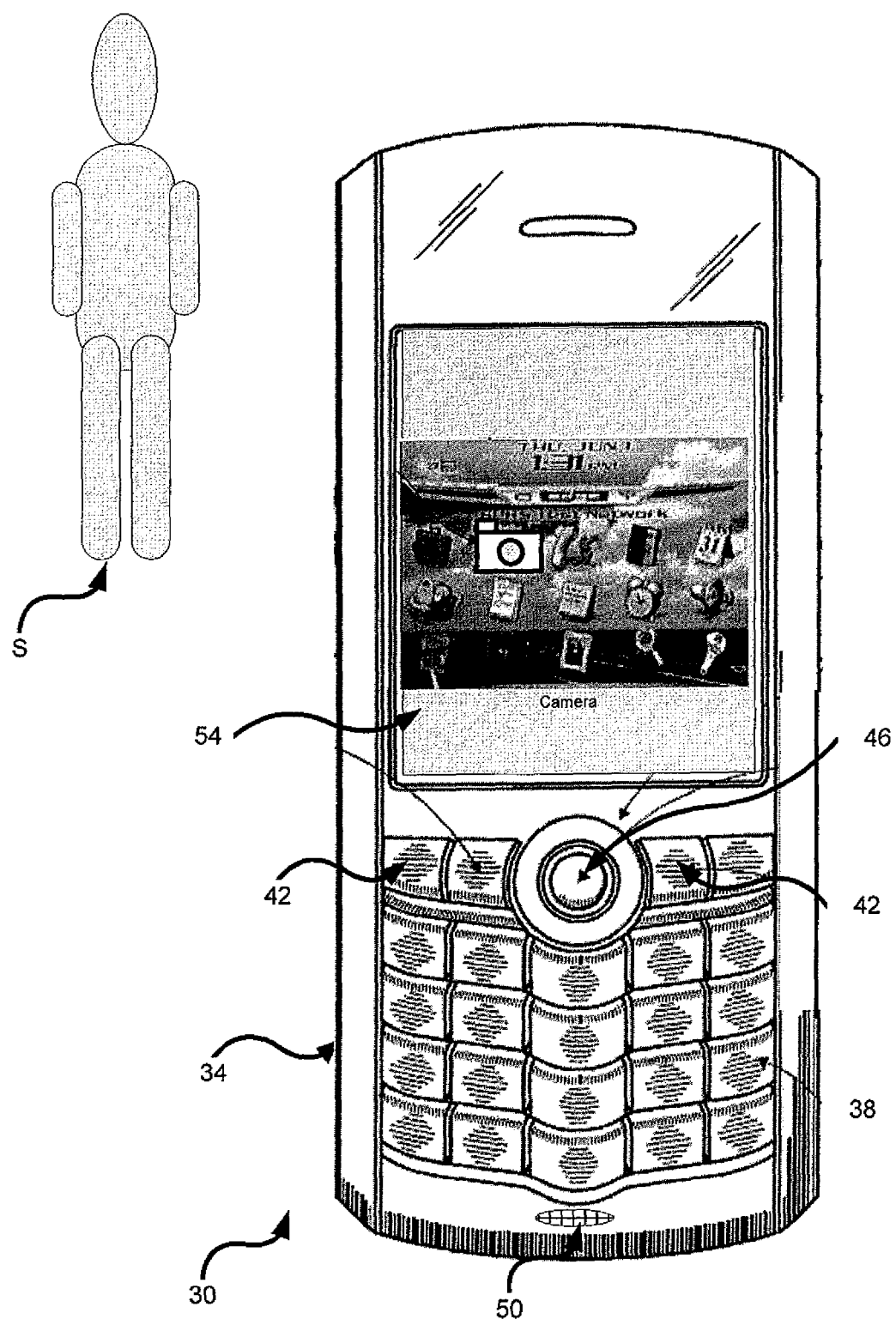
FIG. 7 shows the device in FIG. 1 in relation to a subject to be photographed.

In addition to crop selection screen 156, or instead of crop selection screen 156, when the user selects the crop icon 144, the user can be given the option of setting the picture within preview screen 124 as the home screen for device 30, so that this picture will appear, for example, as background on the main menu screen that is shown in FIG. 7. Selecting crop icon 144 can result in the user being given an option of proceeding to crop selection screen 156, or to simply set the picture as a picture for the home screen, or store the picture in association with a contact in the contact manager. Alternatively, crop selection screen 156 can be used to crop a picture for other purposes, other than for simply selecting the face of an individual for storing in a contact manager application.

Figure 16:
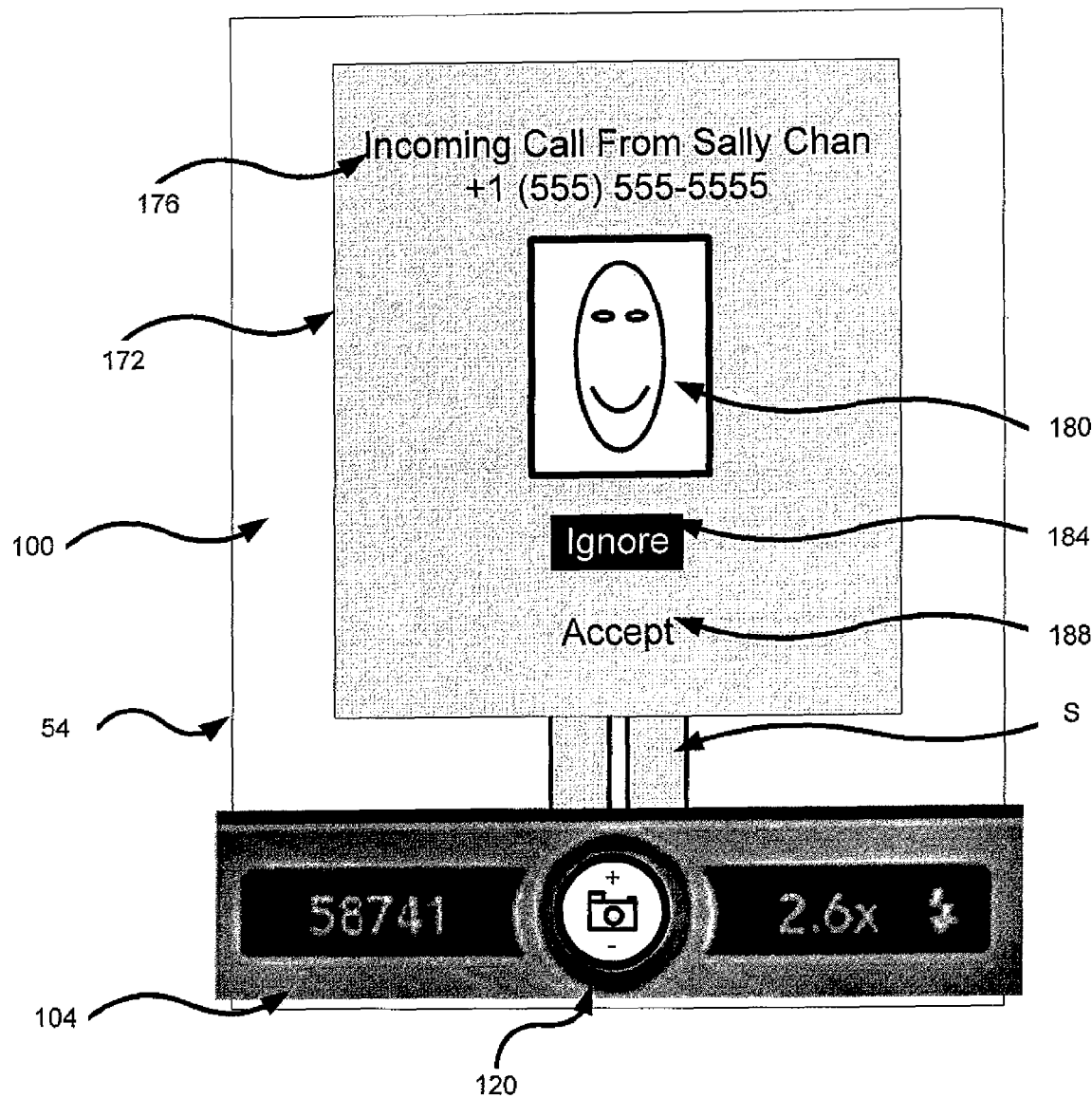

In another embodiment, an incoming call screen that can be generated at any time during the performance of method 300 is provided. The novel incoming call screen according to the embodiment is indicated generally at 172 in FIG. 16. Incoming call screen 172 appears when device 30 receives an incoming telephone communication (or the like) during the performance of method 300, and thus incoming call screen 172 overlays viewfinder 100 to inform the user of the incoming call.

Incoming call screen 172 includes an identification field 176 which, in the present example, reads "Incoming Call from Sally Chan +1 (555) 555-5555". Identification field 176 thus identifies the nature of the incoming communication (i.e. telephonic, vs instant message); the name of the caller (i.e. Sally Chan); and the telephone number of the caller.

Incoming call screen 172 also includes a photograph field 180, where the photograph of the incoming caller (in this case, "Sally Chan") is displayed. The photograph displayed in photograph field 180 can have been previously captured and stored in persistent storage device 82 using method 300, or the photograph can have been stored on persistent storage device 82 by some other means.

Incoming call screen 172 also includes an ignore field 184 and an accept field 188. Either one of ignore field 184 and accept field 188 can be selected by scrolling between them using trackball 46. The actual field that is selected is highlighted, and in the case of FIG. 16, the ignore field 184 is highlighted. The option corresponding to the highlighted field can be ultimately activated by depressing trackball 46. Choosing the ignore field 184 will result in the incoming call being rejected and handled via voicemail or as otherwise desired. If the ignore field 184 is chosen, then device 30 resumes operation of method 300, which in the present example results in display 54 returning to the state shown in FIG. 8. Choosing the accept field 188 will result in the incoming call being accepted and communication between device 30 and the incoming caller will be established in the usual manner. As desired, device 30 can be configured to continue performance of method 300 during the telephone call, perhaps by activating a speakerphone option or using a headset, allowing the user to conduct the telephone call while completing method 300. Alternative, device 30 can be configured to cause method 300 to terminate if the incoming call is accepted.

In the present embodiment, screen 172 has been configured so that ignore field 184 is highlighted by default, allowing the user to quickly assess the nature of the incoming call and reject that call simply by depressing trackball 46 and allowing the user to return to performance of method 300 as quickly as possible, so that the incoming call presents the least amount of intrusion to the performance of method 300. However, it can also be desired to configure screen 172 so that accept field 188 is highlighted by default, allowing the user to quickly accept the call. It is also contemplated that device 30 can be configured so as to permit the user to select which of ignore field 184 or accept field 188 will be highlighted by default when screen 172 is activated.

The foregoing discussion in relation to screen 172 is also applicable to other types of notifications that could arise while a picture is being taken. An incoming email, an incoming text message, an incoming instant message, and a calendar alarm are examples of such other types notifications. If desired, device 30 can be configured to have screens, such as screen 172, which can appear during the performance of method 300. Alternatively, the user can be given the option of configuring, according to personal preferences, which types of such notifications would be permitted to interrupt performance of method 300, and which types of notifications would not.

The foregoing represents exemplary embodiments and is not intended to restrict the scope of the claims attached hereto.

The invention claimed is:

1. A method for controlling the display of a portable electronic device having a camera function; the portable electronic device including a light-sensitive transducer for receiving a first image and a trackball for use as a user-input device; the method comprising:

setting a default zoom level;

activating a viewfinder by generating a second image on the display that corresponds to the first image; the second image having a field of view that corresponds to the default zoom level;

receiving rolling input from the trackball; the input representing an instruction either to zoom-in to or zoom-out from the field of view;

adjusting the zoom level based on whether the instruction indicated zoom-in or zoom-out;

regenerating the second image, on the viewfinder, with an enlarged or reduced field of view according to the zoom level from the adjusting;

receiving an input from the trackball corresponding to the trackball being depressed; and capturing at least a portion of the first image, the portion corresponding to the second image within the viewfinder according to the zoom level.

2. The method of claim 1 wherein the device includes at least one additional function in addition to the camera function; the method further comprising, prior to setting, receiving a request to activate the camera function.

3. The method of claim 2 wherein the at least one additional function includes at least one of wireless telephony and wireless email.

4. The method of claim 1 wherein the rolling input in a first direction represents zoom-in and the rolling input in a second direction, opposite to the first direction, represents zoom-out.

5. The method of claim 1 further comprising generating an icon image of the trackball on the display that corresponds to whether the trackball is in a rest position or is in a rolling position.

6. The method of claim 5 wherein the rest position corresponds to the zoom being at any one of a minimum zoom level, an intermediate zoom level and a maximum zoom level; and the method further comprising generating one of three icon images.

7. The method of claim 6 wherein the icon corresponding to the minimum zoom level indicates that only zooming-in is available; the icon corresponding to the intermediate zoom level indicates that both zooming-in and zooming-out are available; and the icon corresponding to the maximum zoom level indicates that only zooming-out is available.

8. The method of claim 1 wherein the device includes a telephony or instant messaging application, the method further comprising presenting a notification screen, overlaying the viewfinder, indicating that an incoming communication is being received via the telephony or instant messaging application.

9. The method of claim 8 wherein the notification screen includes an identifier of an originator of the incoming communication; the identifier including a photograph of the originator.

10. The method of claim 9 wherein the notification screen includes an ignore field and an accept field, and the ignore field is highlighted by default.

11. A computer readable medium for storing a set of programming instructions according to the method of claim 1.

12. A portable electronic device comprising:

a processor interconnecting a trackball, a light-sensitive transducer, a display, a persistent storage device and a volatile storage device;

the processor configured to generate a viewfinder on the display;

the viewfinder reproducing an image, received via the light-sensitive transducer, the image having a field of view;

the processor configured to receive rolling input from the trackball and to enlarge or reduce the field of view of the image on the viewfinder depending on a direction of the rolling input; and the processor further configured to receive a signal corresponding to the trackball being depressed, and, responsive to the signal, capture for saving on the persistent storage device a captured image; the captured image corresponding to the image on the viewfinder according to the zoom level.

13. The device of claim 12 wherein the rolling input in a first direction represents zooming-in and the rolling input in a second direction, opposite to the first direction, represents zooming-out.

14. The device of claim 12 wherein the processor is further configured to generate, in conjunction with the viewfinder, an icon image of the trackball on the display that corresponds to whether the trackball is in a rest position or is in a rolling position.

15. The device according to claim 14 wherein the rest position corresponds to the zoom being at any one of a minimum zoom level, an intermediate zoom level and a maximum zoom level.

16. The device of claim 15 wherein the processor is configured to generate three icons corresponding to the rest position; a first one of the icons corresponding to the minimum zoom level indicates that only zooming-in is available; a second one of the icons corresponding to the intermediate zoom level indicates that both zooming-in and zooming-out are available; and a third one of the icons corresponding to the maximum zoom level indicates that only zooming-out is available.

17. The device of claim 12 wherein the device includes at least one of a telephony application or an instant messaging application; the processor further configured to generate a notification screen, overlaying the viewfinder, indicating that an incoming communication is being received via the telephony or instant messaging application.

18. The device of claim 17 wherein the notification screen includes an identifier of an originator of the incoming communication; the identifier including a photograph of the originator.

19. The device of claim 18 wherein the notification screen includes an ignore field and an accept field, and the ignore field is highlighted by default.

* * * * *